Nov. 2, 1937.　　L. W. C. PEDDICORD　　2,097,530
REFRIGERATOR FOOD DISPLAY CASE
Filed Oct. 3, 1936
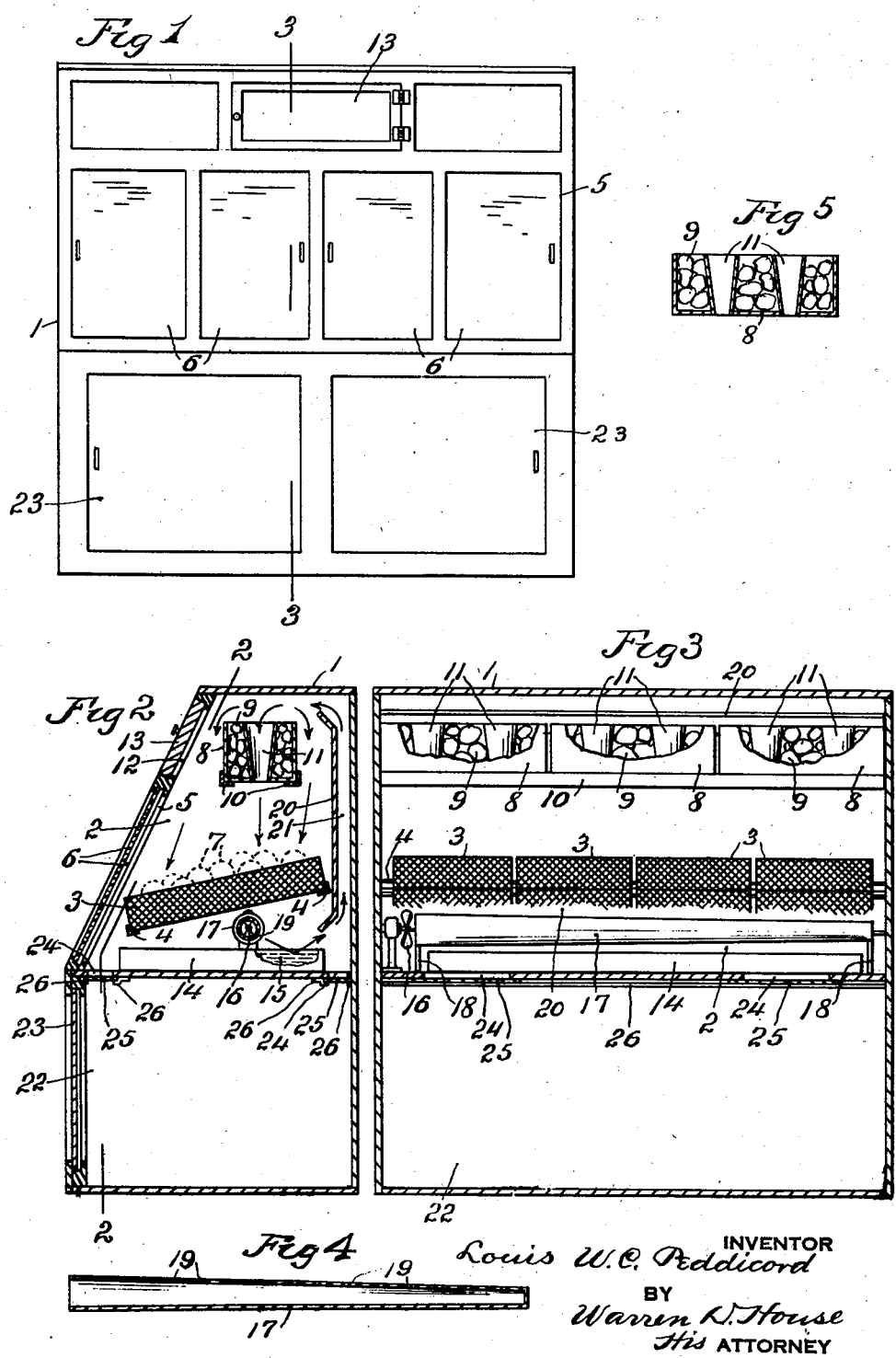
INVENTOR
Louis W. C. Peddicord
BY
Warren D. House
His ATTORNEY Patented Nov. 2, 1937

2,097,530

UNITED STATES PATENT OFFICE 2,097,530

REFRIGERATOR FOOD DISPLAY CASE

Louis W. C. Peddicord, Topeka, Kans., assignor of one-half to Richard R. Houdek, Topeka, Kans.

Application October 3, 1936, Serial No. 103,891

5 Claims. (Cl. 62—89.5)

My invention relates to improvements in refrigerator food display cases. It relates particularly to the type of food display cases in which food, such as fruit and vegetables, is placed on a support at the rear of a window or windows, which can be opened for insertion and removal of the food articles and through which the food is visible.

One of the objects of my invention is the provision of novel means for refrigerating and moistening the food while the latter is so held on display.

A further object of my invention is the provision of novel means for cooling and moistening the food held on display, which means is simple, cheap, durable, not likely to get out of order, which is sanitary, easily and quickly cleaned, and which is efficient in operation.

The novel features of my invention are hereinafter fully described and claimed.

In the accompanying drawing which illustrates the preferred form of my invention, Fig. 1 is a front elevation of my improved food display case.

Fig. 2 is a section on the line 3—3 of Fig. 1, parts removed.

Fig. 3 is a section on the line 2—2 of Fig. 2, parts removed.

Fig. 4 is a longitudinal sectional view of the air distributing tube on a plane extending obliquely downwardly and rearwardly through the discharge openings of the tube, as viewed in Fig. 2.

Fig. 5 is a longitudinal vertical sectional view through one of the refrigerating elements.

Similar characters of reference designate similar parts in the different views.

1 designates the body of my improved food display case which is provided with a refrigerating chamber 2, in the lower portion of which is provided a support for food articles, such as fruit or vegetables. Said support, as shown, comprises wire baskets 3 mounted upon two longitudinal parallel angle bars 4 supported at their ends by the end walls of the case 1, and disposed one in front of and lower than the other, whereby the baskets 3 incline downwardly and forwardly at the rear of a front window 5 provided with transparent glass panes 6 slidable to and from a closed position, to permit the insertion and removal of the food articles, which, when in the baskets, are visible through the panes 6 from the exterior.

The foregoing description applies in part to display cases in common use.

My improvement provides means for refrigerating the air in chamber 2 and forcing the refrigerated air, which has been previously moistened, into contact with the food articles 7, shown in dotted lines in Fig. 2.

Any known suitable means may be provided for refrigerating the air in chamber 2. In the form shown, the refrigerating means is disposed in the chamber 2 above the food support, and comprises metal boxes 8 adapted to contain ice 9 and mounted upon two horizontal parallel bars 10, the ends of which are fastened to and supported by the ends of the case 1. The boxes 8 are each provided with air passages having downwardly converging conoidal walls 11.

The front of the case 1 is provided with a doorway 12 forward of the ice boxes 8, and through which access may be had to said boxes for the placing of cracked ice therein. A door 13 normally closes the doorway 12.

For catching water which may drip from the baskets 3, and for humidifying the air in chamber 2, a pan 14 rests on the floor of the chamber under the baskets and contains water 15.

For forcing air in the chamber 2 from below the baskets 3 to the upper part of the chamber and thence in contact with the boxes 8 and the ice 9 contained therein, and then downwardly into contact with the food articles 7 in the baskets 3, there is provided an electrically driven fan 16, which, when operated, forces air into the larger open end of a horizontal longitudinally disposed pipe 17 of tapering form, which converges toward its smaller closed end, and which is supported at its ends respectively by vertical posts 18 mounted on the floor of the chamber 2.

The under side of the pipe 17 is provided with air outlet means comprising perforations 19 which face downwardly and rearwardly so as to discharge air from the pipe downwardly and rearwardly against the surface of the water 15 in the pan 14, thereby moistening the air so discharged.

For conducting the air so moistened from below the baskets 3 upwardly to the upper part of the chamber 2, there is provided a partition 20, located at the rear of the baskets 3 and forward of and spaced from the rear wall of the case 1, thus providing a vertical air passage 21. The partition 20 has its upper end diverging from the rear wall and spaced from the top of the case 1. The lower end of the partition 20 diverges from the rear wall and is spaced from and disposed above the pan 14.

When the fan 16 is operated air in the chamber 2 below the baskets 3 is forced into the pipe 17 and from there out through the perforations 19 into contact with the water 15, which humidifies the air which then passes upwardly through the passage 21, thence downwardly in contact with the metal boxes 8 and the ice 9 therein and the conoidal walls 11, whereby the air is chilled, after which it passes downwardly into contact with the food articles 7 in the supporting baskets 3.

The moistening of the air performs the double function of enabling it to moisten the food articles 7 in the baskets 3, and to lower the temperature of the air.

Below the chamber 2 in the case 1 is provided a storage chamber 22, having front doors 23. The floor of the chamber 2, which is the top of the chamber 22, is provided at the front and rear respectively of the pan 14 with passages 24 therethrough, which passages may be respectively closed by sliding doors 25 respectively mounted in guides 26 on the underside of the floor of chamber 2. By opening the doors 25, a circulation of air between the chambers 2 and 22 is obtained, when the fan 16 is operated.

With the use of my improved refrigerator food display case, food on display may be kept moist and cold. Water condensed from the air and on the food will drip from the baskets 3 into the pan 14.

Various modifications of my invention, within the scope of the appended claims, may be made without departing from the spirit of my invention.

What I claim is:—

1. In combination with a refrigerator food display case having a chamber provided at the front with an observation window movable to and from a closed position for insertion or removal of food, and having above said window a doorway and a door therefor, and a food support in said chamber at the rear of said window, refrigerating means in said chamber above said support and at the rear of and accessible to through said doorway, air conducting means leading from below said support to a point higher than said refrigerating element, and means for forcing air from below said support upwardly through said conducting means and then downwardly past and in contact with said refrigerating element and into contact with food on said support.

2. In combination with a refrigerator food display case having a chamber provided at the front with an observation window movable to and from a closed position for insertion and removal of food, and having a doorway and a door therefor above said window, and a food support in said chamber at the rear of said window, refrigerating means in said chamber above said support and at the rear of and accessible to through said doorway, air conducting means leading in said chamber from below said support upwardly to a point above said support, a water container in said chamber below said support, and means for forcing air from below said support in said chamber into contact with water in said container and thence through said conducting means upwardly into contact with said refrigerating means and thence downwardly into contact with food on said support.

3. In combination with a refrigerator food display case having a chamber provided with an observation window, and a food support in said chamber in position for displaying food through said window, refrigerating means in said chamber, a water container in said chamber below said support, a tube having outlet means disposed so as to discharge air from said tube into contact with water in said container, air conducting means in said chamber leading from below to a point higher than said support, and means for forcing air in said chamber from below said support into said pipe and through said outlet means into contact with water in said container and thence upwardly through said air conducting means past and in contact with said refrigerating means and thence downwardly into contact with food on said support.

4. In combination with a refrigerator food display case having a chamber, and a food support in said chamber, refrigerating means in said chamber above said support, a pan in said chamber adapted to contain water and disposed under said food support in position to catch water dripping therefrom, air conducting means leading from below said support to a point in said chamber higher than said support, and means for forcing air in said chamber from below said support into contact with water in said pan and thence upwardly through said air conducting means into contact with said refrigerating means and thence downwardly into contact with food on said support.

5. In combination with a refrigerator food display case having a chamber, and a food support in said chamber, refrigerating means in said chamber above said food support comprising ice containing means provided with air conducting passages therethrough, air conducting means leading from below said support upwardly to a point above said support, a water containing pan under said support located to catch water dripping from said support, a tube having air outlet means disposed to discharge against water in said pan, and means for forcing air in said chamber from below said support into said tube and through said air outlet into contact with water in said pan and thence upwardly through said air conducting means above said refrigerating means and thence downwardly through said passages into contact with food on said support.

LOUIS W. C. PEDDICORD.